United States Patent [19]

Beamish et al.

[11] Patent Number: 5,139,858

[45] Date of Patent: Aug. 18, 1992

[54] CRYOGENIC RESISTANCE THERMOMETER COMPRISING A GRANULAR NICKEL IN SILICA FILM

[75] Inventors: John R. Beamish, Newark, Del.; Norbert Mulders, Goleta, Calif.; Brian M. Patterson; Karl M. Unruh, both of Newark, Del.

[73] Assignee: University of Delaware, Newark, Del.

[21] Appl. No.: 608,950

[22] Filed: Nov. 5, 1990

[51] Int. Cl.$^5$ ................................................ B32B 9/00
[52] U.S. Cl. ..................... 428/220; 428/332; 428/333; 428/328; 428/402; 428/446; 374/183; 374/185; 338/306; 338/307; 338/308; 204/192.21
[58] Field of Search ............... 428/220, 328, 332, 333, 428/402, 446; 374/183, 185; 338/22 R, 25, 306, 307, 308; 204/192.1, 192.21

[56] References Cited

PUBLICATIONS

K. M. Unruh, B. M. Patterson, J. R. Beamish, N. Mulders, S. I. Shah; J. Appl. Phys. 68 (6) 3015-3107 (Sep. 15, 1990).
Rubin et al., Cryogenics 22 491 (1982).
Sample et al., Rev. Sci. Instrum. 53 1129 (1982).
Abeles et al., Adv. Phys. 24 407 (1975).
Unruh et al., Bull. Amer. Phys. Soc. Mar. Mtg. 1989 Paper S 18 9.
Gershenfeld et al., J. Appl. Phys. 64 (9) 4760.
Yotsuya et al. Appl. Phys. Lett. 51 235 (1987).

*Primary Examiner*—Patrick J. Ryan
*Assistant Examiner*—Elizabeth Evans
*Attorney, Agent, or Firm*—Dean R. Rexford

[57] ABSTRACT

R.F. sputtered nickel in silica films containing 64 to 70 atomic percent nickel are employed as electrical resistance elements in a resistance thermometer for measuring temperatures of 50° K and less.

9 Claims, 2 Drawing Sheets

Ni$_{70}$(SiO$_2$)$_{30}$  100 nm

CRYOGENIC RESISTANCE THERMOMETER COMPRISING A GRANULAR NICKEL IN SILICA FILM

The government has rights in this invention by virtue of Office of Naval Research grant no. N00014-88-K-0003.

FIELD OF THE INVENTION

This invention pertains to the resistance measurement of cryogenic temperatures below about 50° K.

BACKGROUND AND PRIOR ART

An ideal cryogenic thermometer would be convenient to use, capable of measuring a wide range of temperatures near 0° K., and preferably be insensitive to magnetic fields. Commonly used in the field are platinum and germanium resistance thermometers. These are convenient to use but most are sensitive to magnetic fields (Rubin et al., *Cryogenics* 22 491 (1982)). Carbon-glass thermometers, although less affected by magnetic fields, are useful only over a limited temperature range (Sample et al. *Rev. Sci. Instrum.* 53 1129 (1982)). Gas and capacitance thermometers, while unaffected by magnetic fields require frequent calibration (Rubin et al.).

Thin films of granulated, conducting metals dispersed in non-conducting matrices, prepared by radio frequency (R.F.) sputtering, have been considered for use as resistance elements in resistance thermometers. Thin films are attractive for this use because they have low heat capacities and thus adjust quickly to changes in temperature. It is to this class of material that the granular nickel in silica films of the instant invention belong. These and similar films were reviewed by Abeles et al. in *Adv. Phys.* 24 407 (1975).

Abeles et al. prepared and studied a number of films, some having compositions similar to but not the same as those of the instant invention. FIG. 25 of the Abeles reference reports the resistances of such nickel in silica films containing from 0.44 to 0.08 volume fraction of Ni (approximately 75 to 25 atomic percent as defined by x in the formula $Ni_x(SiO_2)_{(100-x)}$). Of these films, the closest in composition to those of the instant invention is the one containing 0.44 volume fraction (about 75 atomic percent) nickel. The resistance of this film was measured at temperatures as low as about 8.26° K. ($1/T^{.5}=0.35$). The results shown in FIG. 25 of Abeles et al. were disappointing for the designer of a temperature-measuring resistance element because, as is also shown in FIG. 2 of the instant application, the resistance increases by a factor of about 10 million in going from about 100° K. to about 10° K. Below about 50° K. the resistance would be said to be rapidly "approaching infinity". As is known it is difficult to measure very high resistances with accuracy. The results of Abeles et al. do not suggest that unexpectedly useful properties, as set out hereinafter, are to be found in films containing somewhat lesser concentrations of nickel at temperatures less than 50° K.

A recent report (Yotsuya et al. in *Appl. Phys. Lett* 51 235 (1987) proposed reactively sputtered zirconium nitride in this use. Preliminary measurements by Unruh et al. as set out in *Bull. Amer. Phys. Soc. Mar. Mtg.* 1989 paper S18 9 indicate that this film is sensitive to magnetic fields at temperatures below 1° K.

SUMMARY OF THE INVENTION

There is a need for, and it is an object of this invention to provide a process for the measurement of temperatures below about 50° K., said process comprising measuring by art means the resistivity of radio frequency (R.F.) sputtered films containing about 64 to about 70 atomic percent of granular nickel in silica, said film being at the temperature to be measured.

DESCRIPTION OF THE PREFERRED EMBODIMENTS

Granular nickel in silica films with Ni concentrations from about 63 to about 70 atomic percent (about 31 to 38 volume percent) were prepared by R.F. sputtering from single composite targets of Ni and $SiO_2$ essentially in the manner described by Abeles et al. After a base pressure of about $5\times10^{-8}$ Torr was reached the cryopump was throttled. This raised the system pressure typically to about $1\times10^{-7}$ Torr. The argon sputtering pressure was $5\times10^{-3}$ Torr. During sputtering, samples were prepared on sapphire substrates for the resistance measurements reported in FIG. 2., and on quartz substrates for x-ray measurement of particle size. Selected samples were also prepared on grids for transmission electron microscope (TEM) study. The samples prepared for resistance measurements were about 1500 Å thick. Copper electrodes were deposited on their top surfaces.

Resistance was measured as a function of temperature as follows. Samples were mounted inside a helium filled copper cell clamped to the mixing chamber of a dilution refrigerator. The cell was suspended in the bore of a 6 T magnet. Temperatures were measured with a germanium sensor mounted far enough outside the region that the magnetic field did not affect its calibration. Resistance was measured with a 4-wire AC bridge at sufficiently low power levels that Joule heating was insignificant (below 1 pW at the lowest temperatures).

Figure 1:
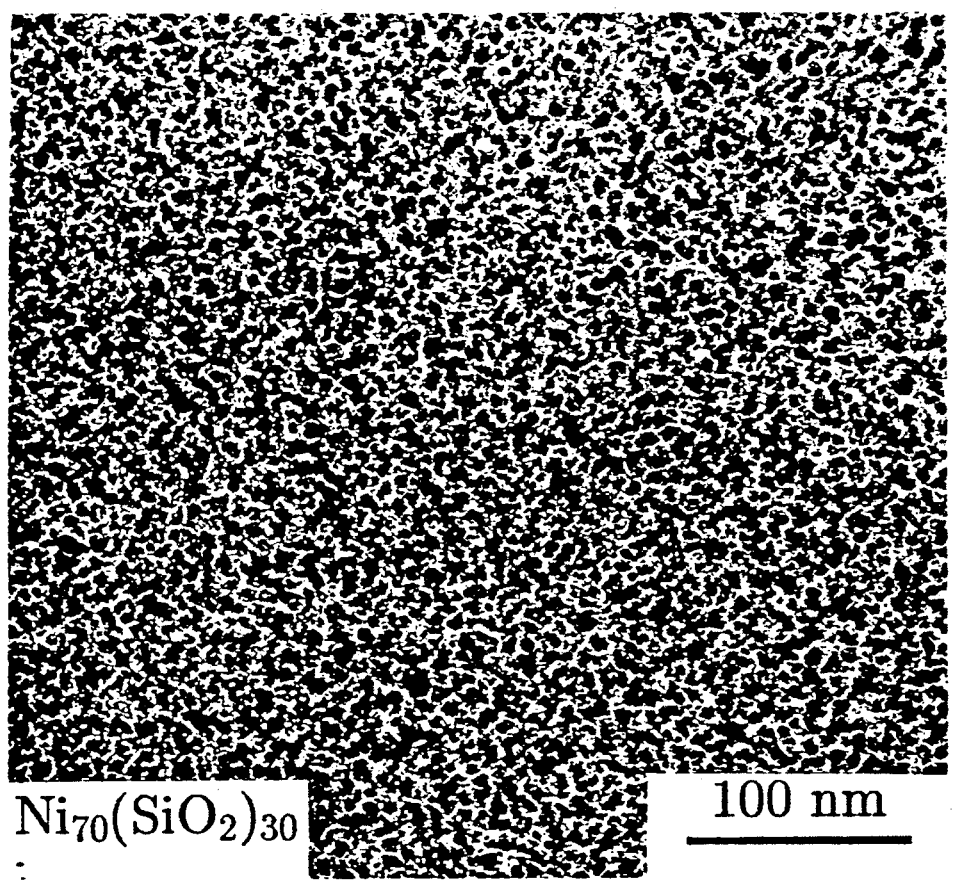
FIG. 1 is a photomicrograph of an R.F. sputtered film of granular nickel in silica typical of the films of the invention. The atomic percent of nickel in this sample, which falls within the invention, was 70.

The results are shown in the Figures. FIG. 1 is a TEM image of a typical 70 atomic percent granulated nickel in silica film within the invention. Dark areas are nickel granules which are contained in a lighter silica matrix. The nickel granules are seen to be nearly uniform in size, roughly 50 to 100 Å in diameter. A simple Scherrer line broadening analysis of the Ni(111) x-ray scattering peak, suggests a particle size of about 80 Å.

Figure 2:
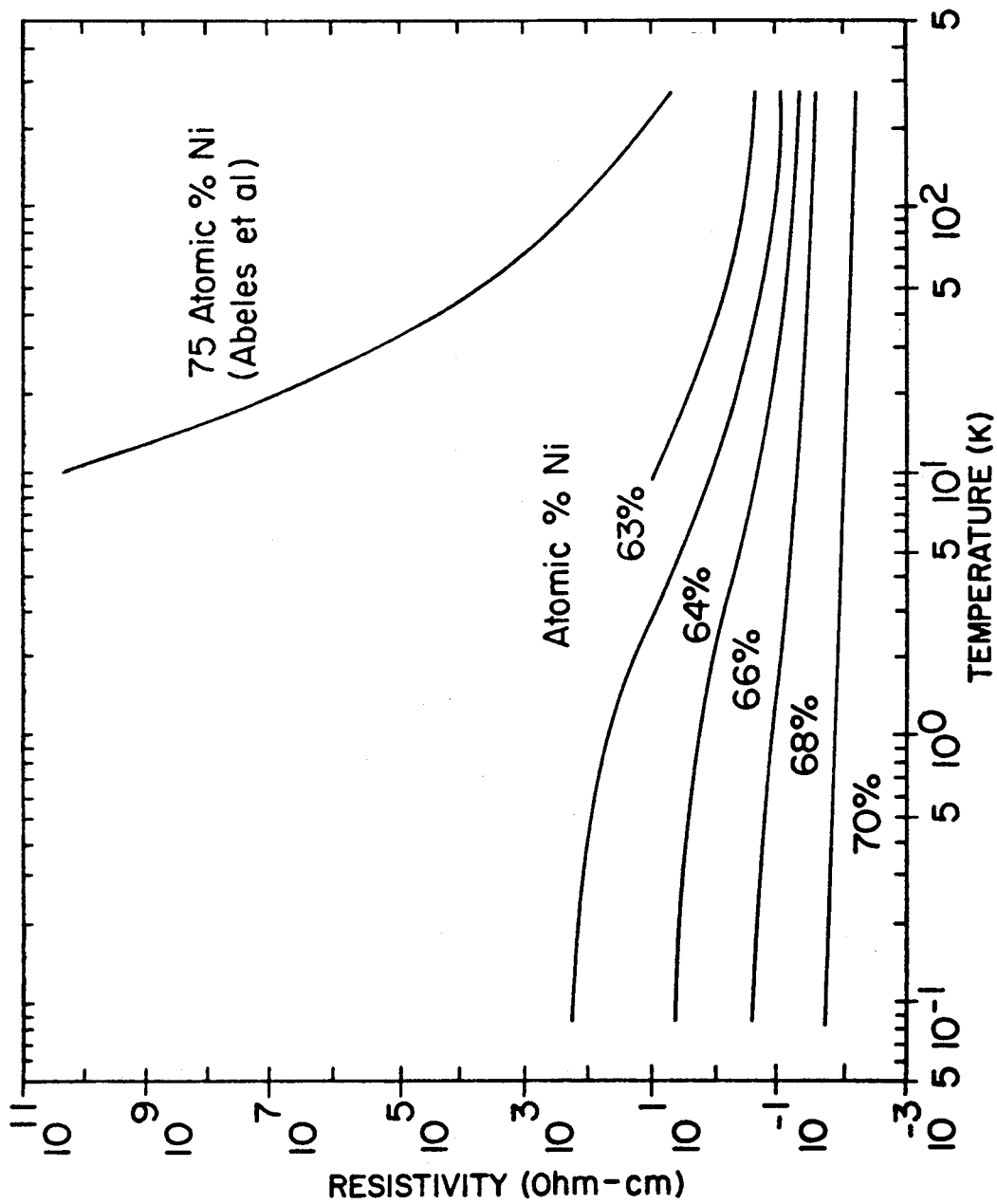
FIG. 2 is a plot of temperature (°K.) versus resistivity (Ohm-cm) wherein is shown the behavior of four films of the invention (64–70 atomic percent Ni), an intermediate composition (63 atomic percent Ni) outside the invention, and a composition of Abeles et al. containing about 75 atomic percent Ni (0.44 vol. fraction).

FIG. 2 is a plot of temperature (°K.) versus resistivity (Ohm-cm) wherein is shown the behavior of four films of the invention (64–70 atomic percent Ni), an intermediate composition outside the invention (63 atomic percent Ni), and a composition of the prior art (Abeles et al., FIG. 25, atomic percent Ni (0.44 vol. fraction).

As is evident from FIG. 2, only those compositions containing about 64 to about 70 atomic percent nickel are useful for measuring temperatures below about 50°

K. The resistance of the prior art film of Abeles et al. containing about 75 atomic percent Ni, which is the composition closest to the invention compositions, increases so rapidly to such high values with decreasing temperature below about 50° K. as to be unsuitable as a temperature measuring resistance element at these temperatures. The films of Abeles et al. containing lesser concentrations of Ni are seen in FIG. 25 to have even steeper slopes. The film containing 63 atomic percent nickel shares these disadvantages, albeit to a somewhat lesser degree. Films containing about 63 to about 70 atomic percent nickel have useful temperature-resistance slopes essentially down to zero as shown in FIG. 2. The preferred film contains about 66 atomic percent nickel.

it is noteworthy that of the four illustrated films of the invention, three showed a sudden and unexpected favorable inflection to lesser temperature dependence at about 2° K. Thus, films of the invention composition are capable of measuring cryogenic temperatures accurately in a wide range, from about 50° K. downward.

The magnetoresistance of the films of the invention are negative and appear to saturate at fields above about 2 T. The maximum decrease in the resistivity is about 1.3 percent at 0.2K, corresponding to a temperature shift of 4 percent. This temperature shift decreases to about 2 percent at 0.5° K.

Thermal recycling of the invention films appears to be essentially without effect. For example, on rapid recycling from room temperature to liquid helium temperatures with intermediate measurement of resistance, all resistance measurements agreed within 0.0004 percent, corresponding to a temperature uncertainty of 0.2 mK.

Having now disclosed our invention, we claim:

1. An R.F. sputtered nickel in silica film useful for the resistance measurement of temperatures below about 50° K. wherein the film consists of about 64 to 70 atomic percent granular nickel in a matrix of silica.

2. The film of claim 1 wherein the film contains 66 atomic percent nickel.

3. The film of claim 1 which is about 1500 Å thick.

4. The process of measuring temperatures of less than about 50° K. which comprises the measurement of the resistivity of an R.F. sputtered nickel in silica film containing from about 64 to about 70 atomic percent nickel, said film being at the temperature to be measured.

5. The process of claim 4 wherein said film contains about 66 atomic percent nickel.

6. The process of claim 4 wherein said film is 1500 Å thick.

7. The process of claim 4 wherein the temperature being measured is less than about 50° K.

8. The process of claim 4 wherein the temperature being measured is less than about 8° K.

9. The process of claim 4 wherein the temperature being measured is less than about 2° K.

* * * * *